US008786935B2

(12) United States Patent
Sprague

(10) Patent No.: US 8,786,935 B2
(45) Date of Patent: Jul. 22, 2014

(54) COLOR ELECTROPHORETIC DISPLAY

(75) Inventor: Robert Sprague, Saratoga, CA (US)

(73) Assignee: SiPix Imaging, Inc., Fremont, CA (US)

( * ) Notice: Subject to any disclaimer, the term of this patent is extended or adjusted under 35 U.S.C. 154(b) by 112 days.

(21) Appl. No.: 13/482,913

(22) Filed: May 29, 2012

(65) Prior Publication Data

US 2012/0307346 A1   Dec. 6, 2012

Related U.S. Application Data

(60) Provisional application No. 61/492,747, filed on Jun. 2, 2011.

(51) Int. Cl.
*G02B 26/00* (2006.01)
*G09G 3/34* (2006.01)
*G02F 1/167* (2006.01)

(52) U.S. Cl.
CPC ..................................... *G02F 1/167* (2013.01)
USPC .......................................... 359/296; 345/107

(58) Field of Classification Search
USPC .............. 359/296; 345/107; 430/32; 204/600
See application file for complete search history.

(56) References Cited

U.S. PATENT DOCUMENTS

| | | | |
|---|---|---|---|
| 3,756,693 A | 9/1973 | Ota | |
| 3,892,568 A | 7/1975 | Ota | |
| 4,298,448 A | 11/1981 | Muller et al. | |
| 5,378,574 A | 1/1995 | Winnik et al. | |
| 5,980,719 A | 11/1999 | Cherukuri et al. | |
| 6,198,809 B1 | 3/2001 | Disanto et al. | |
| 6,337,761 B1 | 1/2002 | Rogers et al. | |
| 6,373,461 B1 | 4/2002 | Hasegawa et al. | |
| 6,486,866 B1 | 11/2002 | Kuwahara et al. | |
| 6,525,866 B1 | 2/2003 | Lin et al. | |
| 6,538,801 B2 | 3/2003 | Jacobson et al. | |
| 6,600,534 B1 | 7/2003 | Tanaka et al. | |
| 6,650,462 B2 | 11/2003 | Katase | |
| 6,693,620 B1 | 2/2004 | Herb et al. | |
| 6,704,133 B2 | 3/2004 | Gates et al. | |
| 6,724,521 B2 | 4/2004 | Nakao et al. | |
| 6,729,718 B2 | 5/2004 | Goto et al. | |
| 6,751,007 B2 | 6/2004 | Liang et al. | |
| 6,829,078 B2 | 12/2004 | Liang et al. | |
| 6,864,875 B2 | 3/2005 | Drzaic et al. | |
| 6,947,203 B2 | 9/2005 | Kanbe | |
| 7,009,756 B2 | 3/2006 | Kishi et al. | |
| 7,034,987 B2 | 4/2006 | Schlangen | |

(Continued)

FOREIGN PATENT DOCUMENTS

CN    1617033    5/2005
EP    1 089 118    4/2001

(Continued)

OTHER PUBLICATIONS

U.S. Appl. No. 13/225,184, Sep. 2, 2011, Wang et al.

(Continued)

*Primary Examiner* — William Choi
(74) *Attorney, Agent, or Firm* — Perkins Coie LLP

(57) ABSTRACT

The present invention is directed to a color display device wherein each of the display cells is filled with an electrophoretic fluid comprising two types of charged pigment particles dispersed in a colored medium. Multiple colors of high quality may be achieved by the present invention.

20 Claims, 12 Drawing Sheets

(56) References Cited

U.S. PATENT DOCUMENTS

| | | | |
|---|---|---|---|
| 7,038,655 B2 | 5/2006 | Herb et al. |
| 7,038,670 B2 | 5/2006 | Liang et al. |
| 7,046,228 B2 | 5/2006 | Liang et al. |
| 7,050,218 B2 | 5/2006 | Kanbe |
| 7,057,600 B2 | 6/2006 | Goden |
| 7,057,798 B2 | 6/2006 | Ukigaya |
| 7,075,502 B1 | 7/2006 | Drzaic et al. |
| 7,226,550 B2 | 6/2007 | Hou et al. |
| 7,271,947 B2 | 9/2007 | Liang et al. |
| 7,283,199 B2 | 10/2007 | Aichi et al. |
| 7,312,916 B2 | 12/2007 | Pullen et al. |
| 7,342,556 B2 | 3/2008 | Oue et al. |
| 7,365,732 B2 | 4/2008 | Matsuda et al. |
| 7,411,719 B2 | 8/2008 | Paolini et al. |
| 7,417,787 B2 | 8/2008 | Chopra et al. |
| 7,502,162 B2 | 3/2009 | Lin et al. |
| 7,545,557 B2 | 6/2009 | Iftime et al. |
| 7,548,291 B2 | 6/2009 | Lee et al. |
| 7,557,981 B2 | 7/2009 | Liang et al. |
| 7,652,656 B2 | 1/2010 | Chopra et al. |
| 7,679,599 B2 | 3/2010 | Kawai |
| 7,760,419 B2 | 7/2010 | Lee |
| 7,782,292 B2 | 8/2010 | Miyasaka et al. |
| 7,830,592 B1 | 11/2010 | Sprague et al. |
| 7,852,547 B2 | 12/2010 | Kim |
| 7,852,548 B2 | 12/2010 | Roh |
| 7,982,941 B2 | 7/2011 | Lin et al. |
| 8,072,675 B2 | 12/2011 | Lin et al. |
| 8,115,729 B2 | 2/2012 | Danner et al. |
| 8,120,838 B2 | 2/2012 | Lin et al. |
| 8,159,636 B2 | 4/2012 | Sun et al. |
| 8,169,690 B2 | 5/2012 | Lin et al. |
| 8,174,492 B2 | 5/2012 | Kim et al. |
| 8,237,892 B1 | 8/2012 | Sprague et al. |
| 8,355,196 B2 | 1/2013 | Yan et al. |
| 8,395,836 B2 | 3/2013 | Lin |
| 8,477,405 B2 | 7/2013 | Ishii et al. |
| 8,570,272 B2 | 10/2013 | Hsieh et al. |
| 2002/0033792 A1 | 3/2002 | Inoue |
| 2002/0171620 A1 | 11/2002 | Gordon et al. |
| 2003/0002132 A1 | 1/2003 | Foucher et al. |
| 2003/0095094 A1 | 5/2003 | Goden |
| 2003/0107631 A1 | 6/2003 | Goto et al. |
| 2003/0132908 A1 | 7/2003 | Herb et al. |
| 2004/0051935 A1 | 3/2004 | Katase |
| 2004/0113884 A1 | 6/2004 | Albert et al. |
| 2004/0136048 A1 | 7/2004 | Arango et al. |
| 2004/0190115 A1 | 9/2004 | Liang et al. |
| 2004/0252361 A1 | 12/2004 | Machida et al. |
| 2004/0263947 A1 | 12/2004 | Drzaic et al. |
| 2005/0024710 A1* | 2/2005 | Kanbe .......................... 359/296 |
| 2005/0151709 A1 | 7/2005 | Jacobson et al. |
| 2005/0190431 A1 | 9/2005 | Matsuda |
| 2006/0197738 A1 | 9/2006 | Kawai |
| 2006/0221049 A1* | 10/2006 | Miyasaka et al. ............. 345/107 |
| 2006/0245060 A1 | 11/2006 | Goto |
| 2007/0002008 A1 | 1/2007 | Tam |
| 2007/0080928 A1 | 4/2007 | Ishii et al. |
| 2007/0268556 A1 | 11/2007 | Chopra et al. |
| 2007/0273637 A1 | 11/2007 | Zhou et al. |
| 2008/0042928 A1 | 2/2008 | Schlangen et al. |
| 2008/0174531 A1 | 7/2008 | Sah |
| 2008/0291526 A1* | 11/2008 | Lin et al. ........................ 359/296 |
| 2009/0034054 A1 | 2/2009 | Ikegami et al. |
| 2009/0251763 A1 | 10/2009 | Sprague et al. |
| 2010/0103502 A1 | 4/2010 | Jacobson et al. |
| 2010/0165005 A1 | 7/2010 | Sprague |
| 2010/0165448 A1 | 7/2010 | Sprague |
| 2011/0199671 A1 | 8/2011 | Amundson et al. |
| 2011/0217639 A1 | 9/2011 | Sprague |
| 2011/0234557 A1 | 9/2011 | Yang et al. |
| 2011/0235159 A1* | 9/2011 | Yan et al. ...................... 359/296 |
| 2011/0261433 A1 | 10/2011 | Sprague et al. |
| 2011/0292094 A1 | 12/2011 | Lin |
| 2012/0007897 A1 | 1/2012 | Yang et al. |
| 2012/0134010 A1 | 5/2012 | Sprague et al. |
| 2012/0307346 A1 | 12/2012 | Sprague |
| 2013/0176612 A1 | 7/2013 | Sprague et al. |

FOREIGN PATENT DOCUMENTS

| | | |
|---|---|---|
| JP | 2004-20818 | 6/2002 |
| JP | 2008-033335 | 2/2008 |
| WO | WO 99/53373 | 10/1999 |
| WO | WO 03/016993 | 2/2003 |
| WO | WO 2007/013682 | 2/2007 |
| WO | WO 2009/105385 | 8/2009 |
| WO | WO 2009/124142 | 10/2009 |
| WO | WO 2009/134889 | 11/2009 |
| WO | WO 2010/027810 | 3/2010 |

OTHER PUBLICATIONS

U.S. Appl. No. 13/360,378, Jan. 27, 2012, Zhang.
U.S. Appl. No. 13/370,186, Feb. 9, 2012, Wang et al.
U.S. Appl. No. 13/371,293, Feb. 10, 2012, Zhang et al.
U.S. Appl. No. 13/551,541, Jul. 17, 2012, Yang et al.
U.S. Appl. No. 13/633,788, Oct. 2, 2012, Wang et al.
U.S. Appl. No. 61/813,551, Apr. 18, 2013, Du et al.
U.S. Appl. No. 61/824,887, May 17, 2013, Lin et al.
U.S. Appl. No. 61/824,901, May 17, 2013, Lin.
U.S. Appl. No. 61/887,241, Oct. 4, 2013, Yu Li et al.
U.S. Appl. No. 61/887,821, Oct. 7, 2013, Huang et al.
U.S. Appl. No. 61/890,106, Oct. 11, 2013, Wang et al.
U.S. Appl. No. 61/893,831, Oct. 21, 2013, Lin et al.
U.S. Appl. No. 61/925,055, Jan. 8, 2014, Huang et al.
U.S. Appl. No. 61/927,418, Jan. 14, 2014, Chan et al.
U.S. Appl. No. 13/875,145, May 1, 2013, Wang et al.
U.S. Appl. No. 13/952,136, Jul. 26, 2013, Hui Du et al.
U.S. Appl. No. 13/973,712, Aug. 22, 2013, Zang et al.
U.S. Appl. No. 14/062,821, Oct. 24, 2013, Sprague.
U.S. Appl. No. 14/083,317, Nov. 18, 2013, Zhang et al.

* cited by examiner

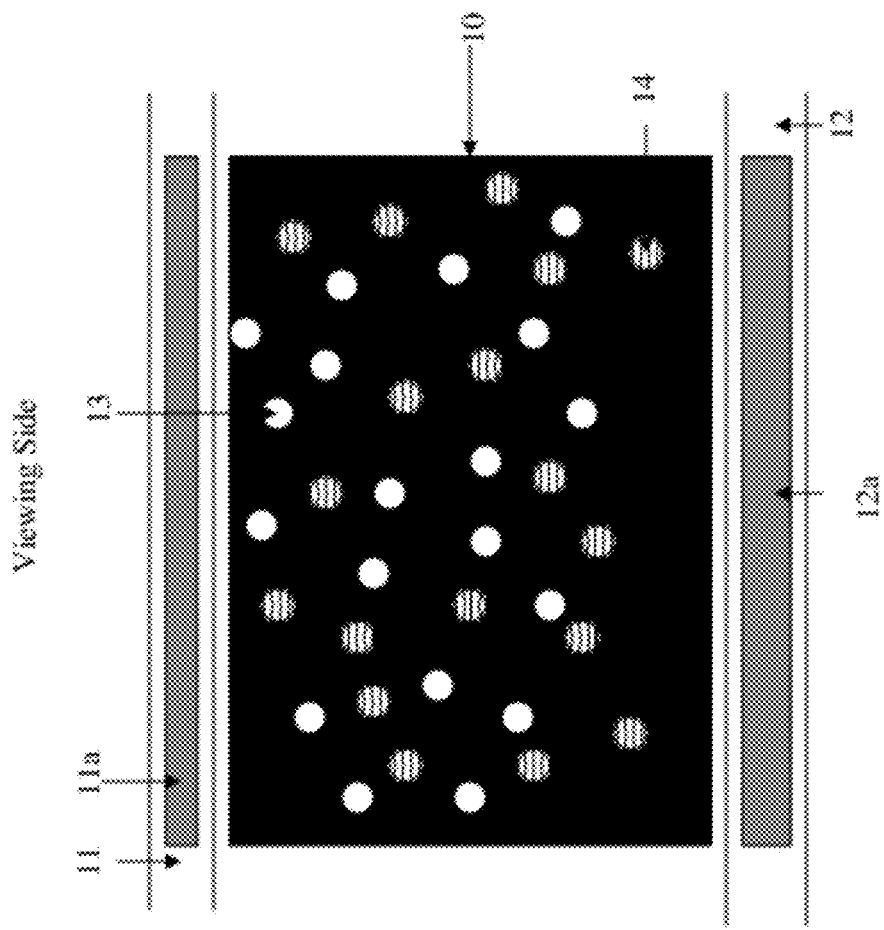

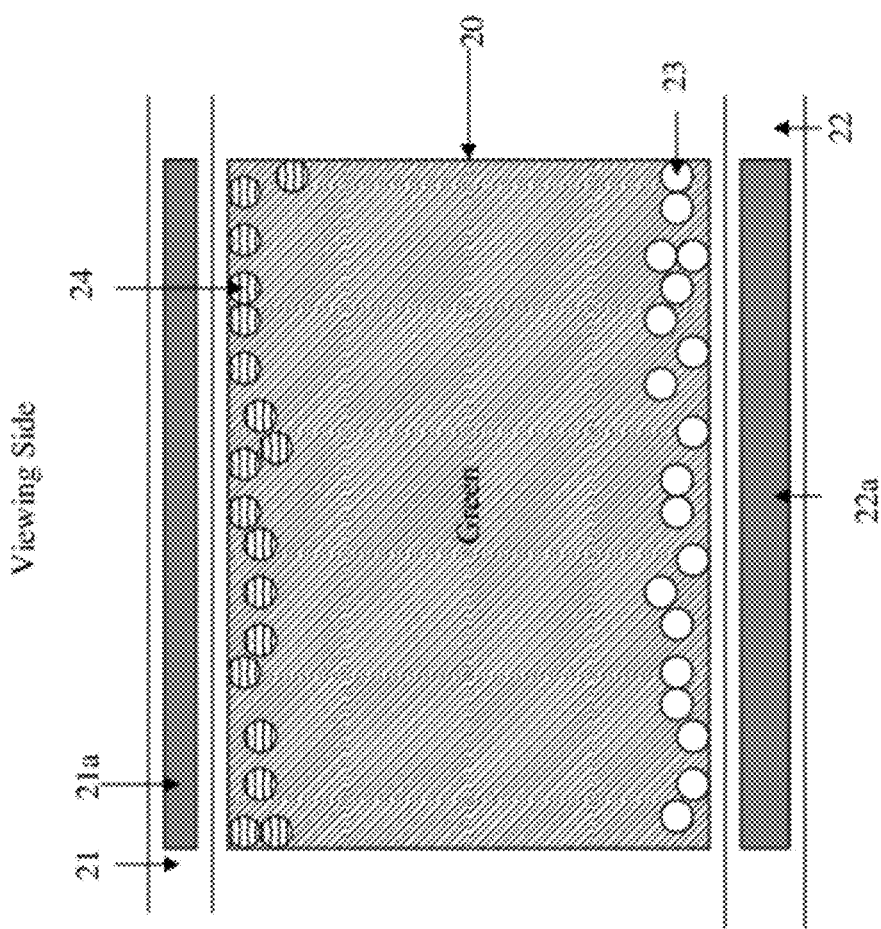

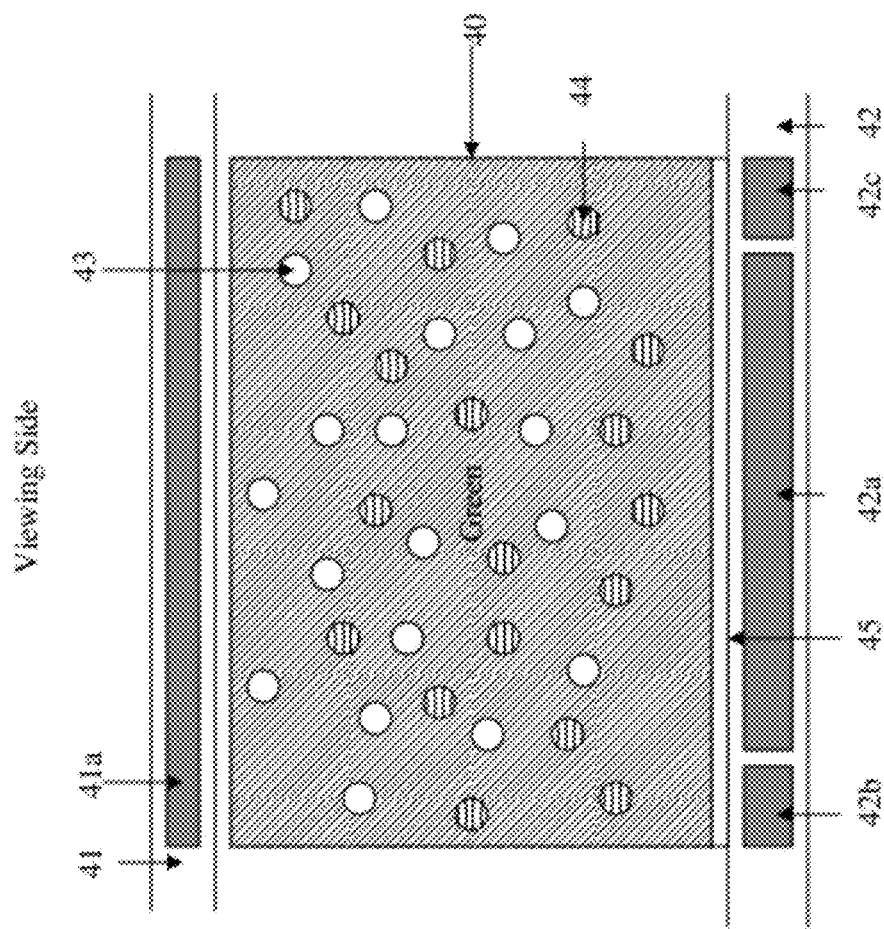

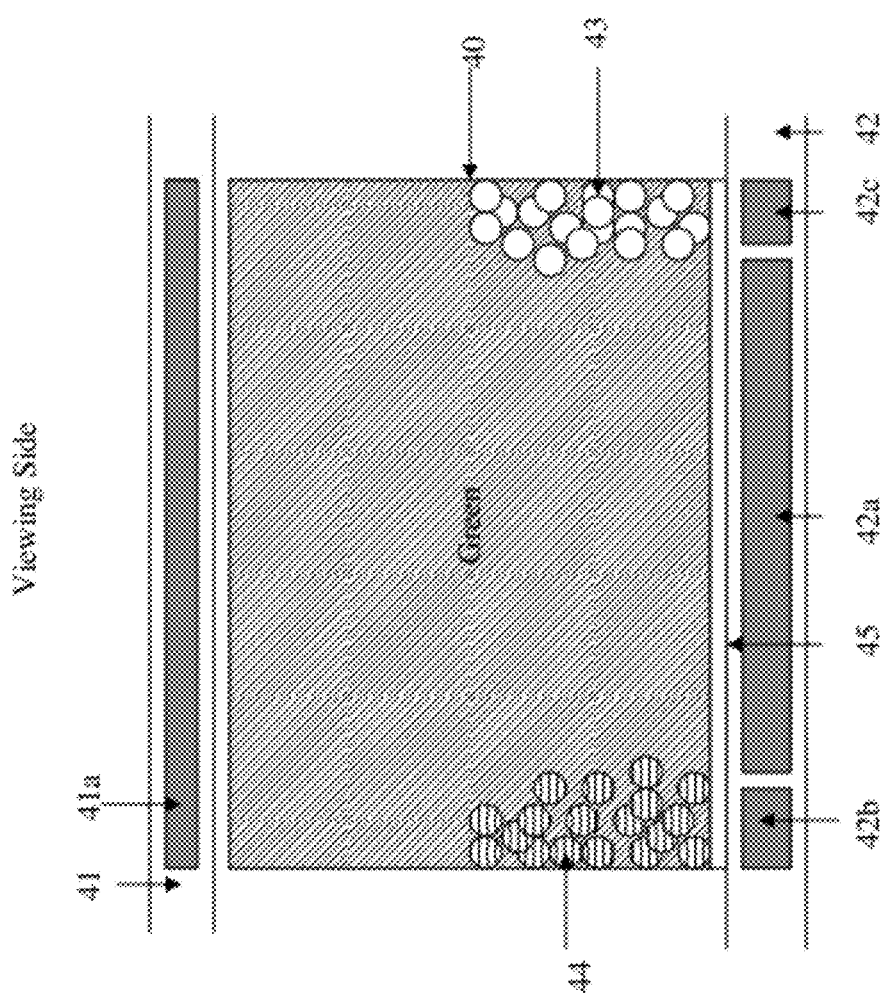

COLOR ELECTROPHORETIC DISPLAY

This application claims priority to U.S. Provisional Application No. 61/492,747, filed Jun. 2, 2011; the content of which is incorporated herein by reference in its entirety.

FIELD OF THE INVENTION

This invention relates to a color electrophoretic display utilizing two types of charged pigment particles dispersed in a colored solvent or solvent mixture.

DESCRIPTION OF RELATED ART

In order to achieve a multicolor display, color filters are often used. The most common approach is to add color filters on top of black/white sub-pixels of a pixellated display to display the red, green and blue colors. When a red color is desired, the green and blue sub-pixels are turned to the black state so that the only color displayed is red. When the black state is desired, all three sub-pixels are turned to the black state. When the white state is desired, the three sub-pixels are turned to red, green and blue, respectively, and as a result, a white state is seen by the viewer.

A major disadvantage of such a technique is that since each of the sub-pixels has a reflectance of about one third of the desired white state, the white state is fairly dim. To compensate this, a fourth sub-pixel may be added which can display only the black and white states, so that the white level is doubled at the expense of the red, green or blue color level (where each sub-pixel is only one fourth of the area of the pixel).

Brighter colors can be achieved by adding light from the white pixel; but this is achieved at the expense of color gamut to cause the colors to be very light and unsaturated. A similar result can be achieved by reducing the color saturation of the three sub-pixels. Even with that, the white level is normally substantially less than half of that of a black and white display, rendering it an unacceptable choice for display devices, such as e-readers or displays that need well readable black-white brightness and contrast.

SUMMARY OF THE INVENTION

The present invention is directed to a display device comprising display cells, wherein each of said display cells is
a) sandwiched between a first layer comprising a common electrode and a second layer comprising a pixel electrode, and
b) filled with a display fluid comprising a first type of pigment particles which are white and a second type of pigment particles which are red, green or blue and said two types of pigment particles are oppositely charged and are dispersed in a colored solvent.

In one embodiment, the white pigment particles are formed from $TiO_2$.

In one embodiment, at least one type of the pigment particles are encapsulated pigment particles.

In one embodiment, the display fluid further comprises a charge control agent.

In one embodiment, the colored solvent is a black solvent.

In one embodiment, the black solvent is a clear and colorless solvent with non-charged or slightly charged black particles dispersed therein.

In one embodiment, the non-charged or slightly charged black particles are substantially transparent.

In one embodiment, the non-charged or slightly charged black particles have a zeta potential of <20.

In one embodiment, the non-charged or slightly charged black particles are polymeric and are in the form of a transparent polymeric matrix, with dye molecules embedded in the matrix.

In one embodiment, the colored solvent has a color which is complementary to the second type of pigment particles.

In one embodiment, the colored solvent is a clear and colorless solvent with non-charged or slightly charged colored particles dispersed therein.

In one embodiment, the second layer further comprises at least one in-plane electrode and said device further comprises a white background layer.

In one embodiment, each display cell defines a sub-pixel and three sub-pixels forms a pixel.

In one embodiment, each display cell defines a sub-pixel and two sub-pixels form a pixel.

BRIEF DESCRIPTION OF THE DRAWINGS

FIGS. 1a-1c depict how an electrophoretic display of the present invention displays different color states.

FIGS. 2a-2c depict an alternative design.

FIGS. 4a-4d depict a further alternative design.

DETAILED DESCRIPTION OF THE INVENTION

Figure 1A:
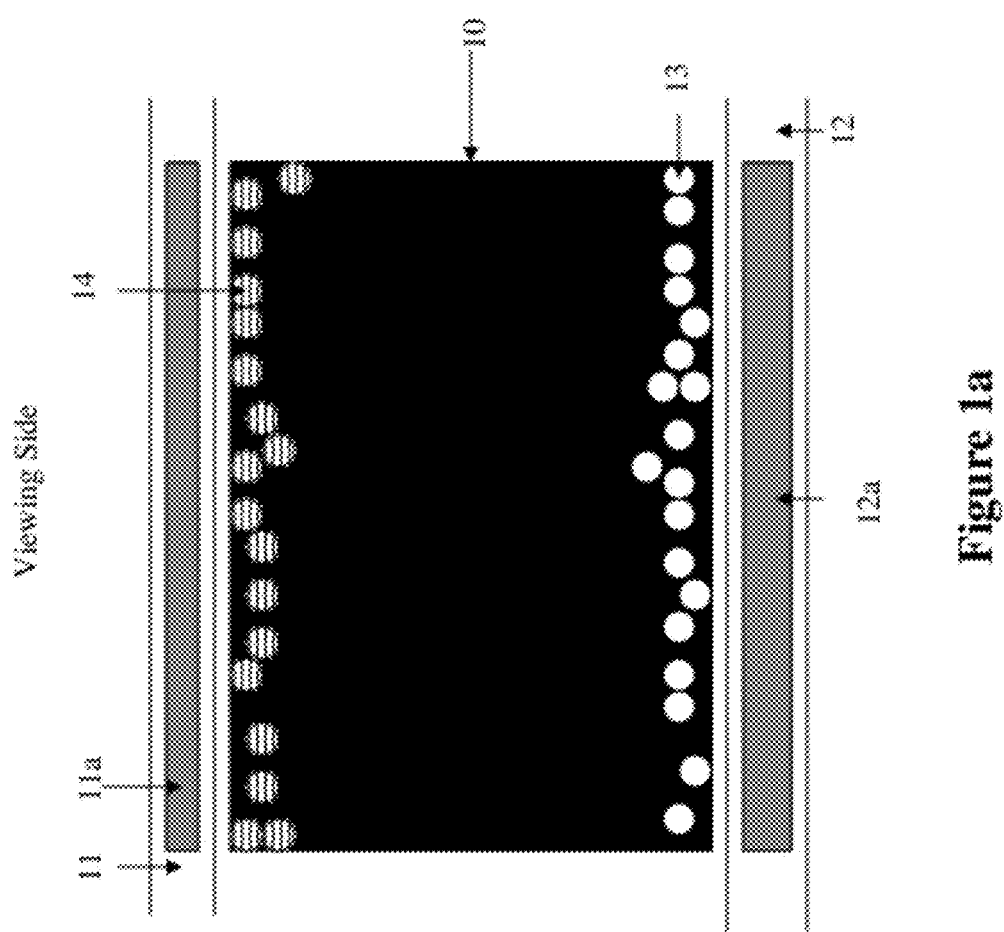

The present invention is directed to an electrophoretic fluid comprising two types of charged pigment particles dispersed in a colored solvent or solvent mixture.

First Design:

In the first aspect of the present invention, the display fluid comprises white charged pigment particles and a second type of charged pigment particles which may be red, green or blue. The two types of charged pigment particles are dispersed in a black solvent.

The white charged pigment particles may be any types of white pigment particles, including inorganic, organic or polymeric white particles. To achieve a high light scattering, pigments of a high refractive index are particularly useful. Suitable white pigment particles may include $TiO_2$, $BaSO_4$ and ZnO, with $TiO_2$ being the most preferred. The white pigment particles may be positively charged or negatively charged.

The colored charged pigment particles may also be inorganic, organic or polymeric particles formed from a pigment, such as pigment red 254 (chemical group diketopyrrolopyrrole), pigment blue 15:6 (chemical group phthalocyanine), pigment green 36 (chemical group Cu phthalocyanine), pigment yellow 155 (chemical group bisacetoacetarylide), pigment red 122 (chemical group quinacridone), pigment blue 15:3 (chemical group phthalocyanine), pigment black 7 (chemical group carbon black) or the like.

The two types of charged pigment particles may also be encapsulated pigment particles.

The two types of charged pigment particles are oppositely charged, and they may exhibit a native charge, or may be charged explicitly using a charge control agent, or may acquire a charge when dispersed in a solvent.

Suitable charge control agents are well known in the art; they may be polymeric or non-polymeric in nature or may be ionic or non-ionic.

The ionic surfactants as charge control agent may include (a) the anionic type: alkane carboxylic salts, alkane sulfonic salts, such as Aerosol OT, alkyl-aromatic sulfonic salts, such as sodium dodecylbenzenesulfonate, isopropylamine, alkyl benzene sulfonate, phosphates, phosphoric salts or the like, and (b) the cationic type: fatty amine salts, quaternary ammonium salts, alkyl pyridium salts or the like.

The non-ionic surfactants as charge control agent may include sorbitan monoesters, polyethoxylated nonionics, polybutene succinimide, maleic anhydride copolymers, vinylpyridine copolymers, vinylpyrrolidone copolymer (such as Ganex™ from International Specialty Products), (meth)acrylic acid copolymers, N,N-dimethylaminoethyl (meth)acrylate copolymers and the like.

Fluorosurfactants are particularly useful as charge controlling agent in a fluorocarbon solvent. These include FC fluorosurfactants such as FC-170C™, FC-171™, FC-176™, FC430™, FC431™ and FC740™ from 3M Company and Zonyl™ fluorosurfactants such as Zonyl™ FSA, FSE, FSN, FSN-100, FSO, FSO-100, FSD and UR from Dupont.

The solvent, in the context of the present invention, may be a colored solvent or solvent mixture or alternatively a clear and colorless solvent with non-charged or slightly charged colored particles dispersed therein.

In the case of a colored solvent or solvent mixture, it preferably has a low viscosity and a dielectric constant in the range of about 2 to about 30, preferably about 2 to about 15 for high particle mobility. Examples of suitable dielectric solvent include hydrocarbons such as isopar, decahydronaphthalene (DECALIN), 5-ethylidene-2-norbornene, fatty oils, paraffin oil, silicone oil, such as DC200 from Dow Corning, aromatic hydrocarbons such as toluene, xylene, phenylxylylethane, dodecylbenzene or alkylnaphthalene; halogenated solvents such as perfluorodecalin, perfluorotoluene, perfluoroxylene, dichlorobenzotrifluoride, 3,4,5-trichlorobenzotrifluoride, chloropentafluoro-benzene, dichlorononane or pentachlorobenzene; and perfluorinated solvents such as FC-43, FC-70 and FC-5060 from 3M Company, St. Paul Minn., low molecular weight halogen containing polymers such as poly (perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden from Ausimont or Krytox Oils and Greases K-Fluid Series from DuPont, Del.

A black colorant is added to the solvent to generate the black color. Alternatively, the black color of the solvent may be achieved by a mixture of colorants to achieve the appearance of a black color.

As stated, the solvent may also be a clear and colorless solvent with non-charged or slightly charged colored particles dispersed therein. The non-charged or slightly charged colored particles are substantially transparent and the color transparency comes from the refractive index similarity between the colored non-charged or slightly charged particles and the solvent in which the particles are dispersed. The non-charged or slightly charged colored particles may have, for example, a zeta potential of <20, preferably <10, more preferably <5 and most preferably <2.

If the refractive index of the non-charged or slightly charged colored particles is not matched to that of the solvent in which the particles are dispersed, the particles may scatter light in the display fluid. In order to eliminate problems associated with the mismatch of the refractive indices, the size of the non-charged or slightly charged colored particles is preferably in the nanometer range, more preferably less than 100 nanometers. Materials for this type of non-charged or slightly charged colored particles may include, but are not limited to, commercially available colorants used in the LCD industry for color filter applications, such as Clariant's Hostaperm Red D2B-COF VP 3781 (i.e., red 254) which is in the class of diketopyrrolopyrrole, Hostaperm Blue E3R-COF VP3573 (i.e., blue 15:6) which is in the class of phthalocyanine, or Hostaperm Violet RL-COF O2 VP3101 (i.e., violet 23) which is in the class of dioxazine.

Alternatively, the non-charged or slightly charged colored particles may be polymeric and are in the form of a transparent polymeric matrix, with dye molecules embedded (e.g., solubilized or dispersed) in the matrix. Since it is easier to match the refractive indices of a polymer matrix and the surrounding solvent, the size of the non-charged or slightly charged particles does not need to be tightly controlled. Examples of this type of non-charged or slightly charged colored particles may include, but are not limited to, dyed polymeric microparticles supplied by Merck Chemicals Ltd.; dyed polystyrene particles supplied by Spherotech Inc. or the like. For the colored particles with a transparent polymeric matrix, the dye embedded (soluble or dispersible) therein is much more dilute and adjustable. For example, the concentration of the red dye in the red particles may be adjusted to allow only the blue or green colors to be absorbed and the red color to pass through. With a white background to reflect the red color, the red color brightness can be maximized.

Figure 1B:
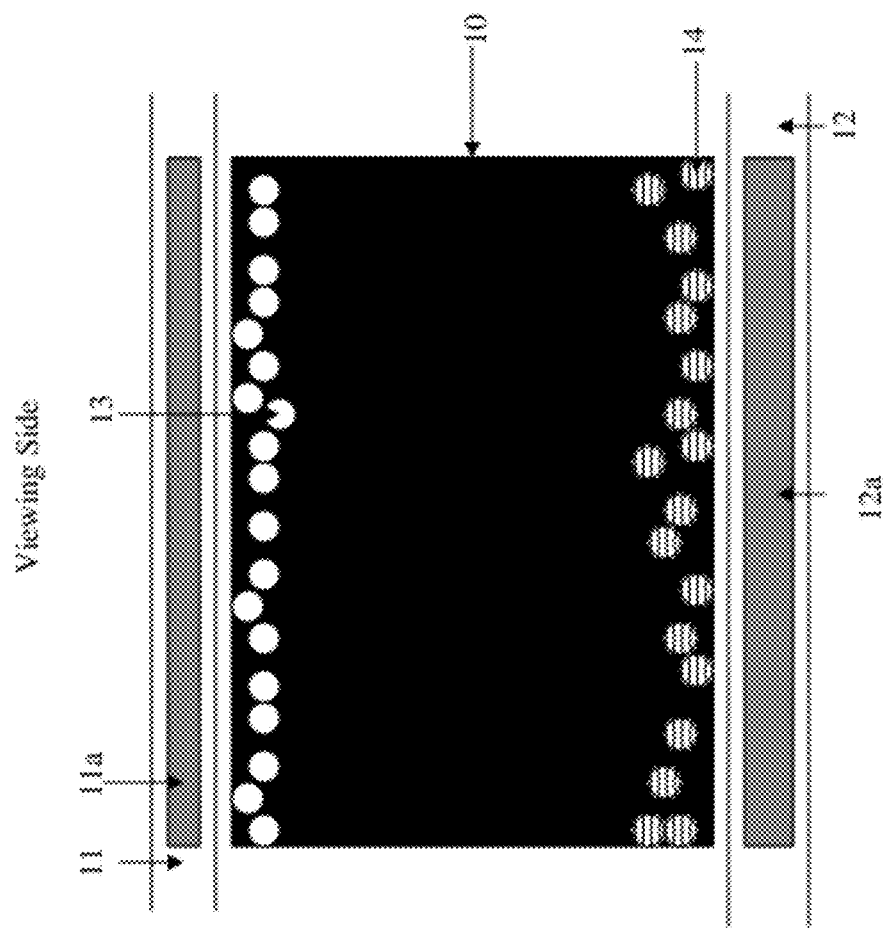

FIGS. 1a-1c depict an example of how a display cell filled with such a display fluid may display three different color states.

As shown in FIG. 1a, a display cell (10) is sandwiched between a first layer (11) comprising a common electrode (11a) and a second layer (12) comprising a pixel electrode (12a) and the display cell is filled with an electrophoretic fluid comprising white charged pigment particles (13) and blue charged pigment particles (14), dispersed in a black solvent.

The white and blue pigment particles are oppositely charged. For example, if the white pigment particles are positively charged, then the blue pigment particles are negatively charged. Accordingly, the two types of charged pigment particles (13 and 14) may move towards the common electrode (11a) or the pixel electrode (12a), depending on the charge polarity of the particles and the voltage potential difference applied to the common electrode and the pixel electrode.

In this example, the common electrode is on the viewing side.

In FIG. 1a, when proper voltages are applied to the common electrode (11a) and the pixel electrode (12a), the charged blue particles (14) would move to be near or at the common electrode (11a) and the oppositely charged white pigment particles (13) would move to be near or at the pixel electrode (12a), causing the blue color to be seen at the viewing side.

In FIG. 1b, when proper voltages are applied to the common electrode (11a) and the pixel electrode (12a), the charged blue particles (14) would move to be near or at the pixel electrode (12a) and the oppositely charged white pigment particles (13) would move to be near or at the common electrode (11a), causing the white color to be seen at the viewing side.

In FIG. 1c, both the blue (14) and the white particles (13) are dispersed throughout the volume of the black solvent. In this case, the viewer sees the black color state. The voltages applied to the common and pixel electrodes, after the particles are dispersed, may be positive, negative or zero as long as they are substantially the same.

Figure 2B:
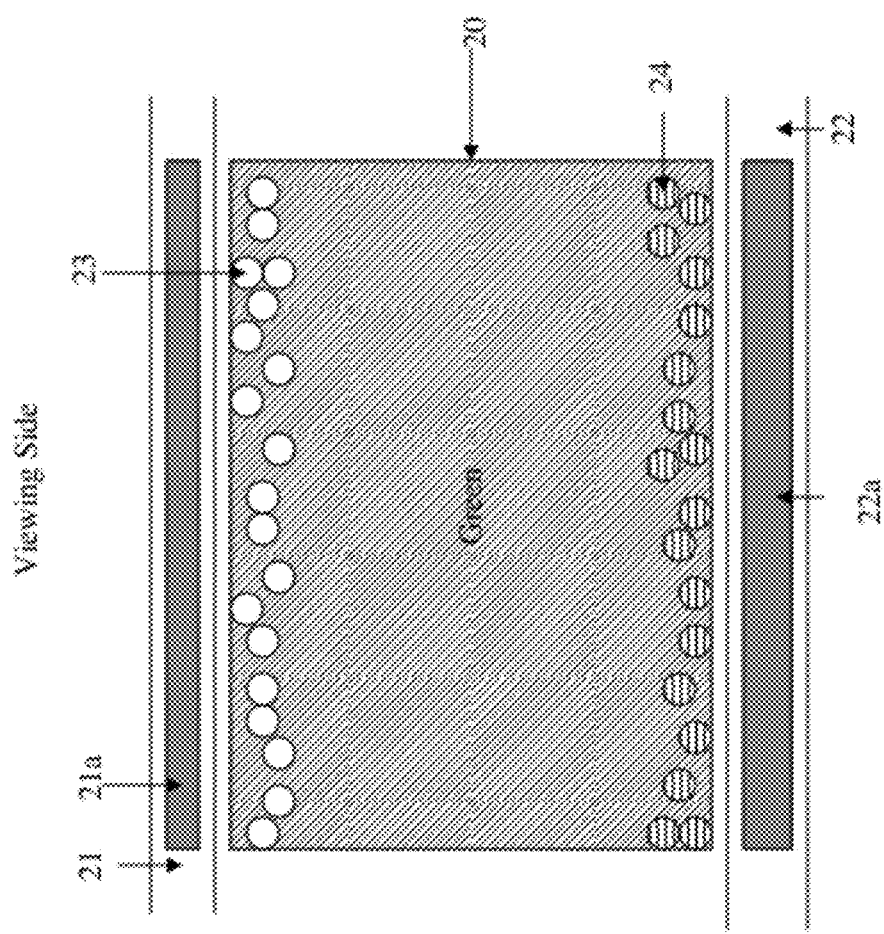
Figure 2C:
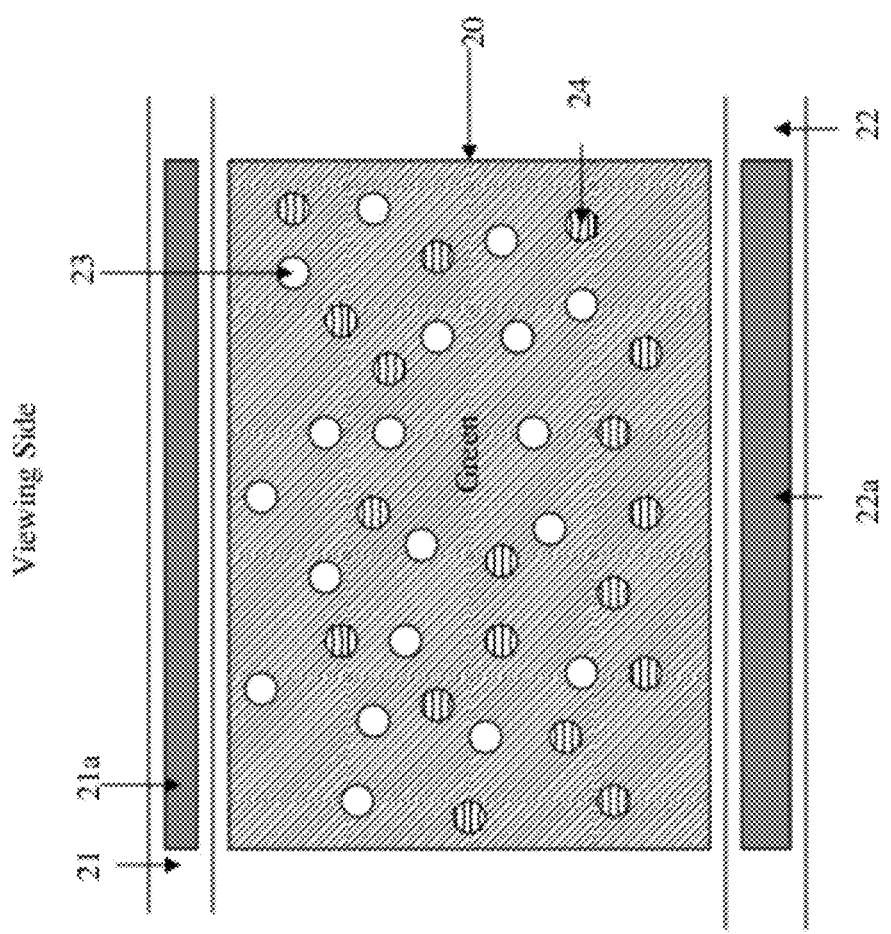

Second Design:

FIGS. 2a-2c illustrate an alternative design of the present invention. As shown in FIG. 2a, a display cell (20) is sandwiched between a first layer (21) comprising a common electrode (21a) and a second layer (22) comprising one pixel electrode (22a).

The display cell (20) is filled with an electrophoretic fluid comprising two types of charged particles, white charged pigment particles (23) and colored charged pigment particles (24), dispersed in a colored solvent. In FIG. 2, the colored pigment particles are blue.

In practice, the colored pigment particles may be red, green or blue and the color of the colored charged pigment particles and the color of the solvent in which the particles are dispersed are complementary. For example, if the color of the particles is red, the color of the solvent would be green or blue. Likewise, if the color of the particles is blue, the color of the solvent then may be red or green.

Therefore the term "complementary color" refers to red, green or blue color and they are complementary to each other. For example, a red color is considered complementary to green or blue; a green color is considered complementary to red or blue; and a blue color is considered complementary to red or green.

Other features (e.g., charge controlling agents and medium) described above for the system of FIG. 1 are also applicable to this design.

Colorants for generating the color of the solvent include a variety of dyes or pigments which are well-known in the art, for example, they may be, but are not limited to, azo or phthalocyanine dyes or the like.

The colored solvent may be replaced with a clear and colorless solvent with non-charged or slightly charged colored particles solubilized or dispersed therein, as described above.

The white pigment particles may be positively or negatively charged and the blue pigment particles are oppositely charged. In this example, the common electrode is on the viewing side.

In FIG. 2a, when proper voltages are applied to the common electrode (21a) and the pixel electrode (22a), the charged blue pigment particles (24) would move to be near or at the common electrode (21a), causing the blue color to be seen at the viewing side.

In FIG. 2b, when proper voltages are applied to the common electrode (21a) and the pixel electrode (22a), the charged white particles (23) would move to be near or at the common electrode (21a), causing the white color to be seen at the viewing side.

In FIG. 2c, both types of pigment particles are dispersed in the green solvent. In this case, a black color is seen at the viewing side because the blue and green colors are complementary colors so that the green reflected light is absorbed by the blue particles and there are enough of the blue particles to absorb the light reflected off the white particles.

While in the examples of FIGS. 1 and 2, the color of the charged pigment particles and the color of the solvent may be varied, as required by the display application.

The display cells as shown in FIGS. 1 and 2 therefore are ideal for a color display device wherein each pixel consists of three sub-pixels.

For the design of FIG. 1, one of the display cells (sub-pixel) may be filled with a fluid comprising white charged pigment particles and blue charged pigment particles dispersed in a black solvent, a second display cell may be filled with a fluid comprising white charged pigment particles and green charged pigment particles dispersed in a black solvent and the third display cell may be filled with a fluid comprising white charged pigment particles and red charged pigment particles dispersed in a black solvent.

FIG. 3 illustrates how multiple colors are displayed with a display device comprising the display fluid of the present invention. Each display cell represents a sub-pixel and each pixel has three sub-pixels. The three display cells, each representing a sub-pixel, are filled with display fluids as described above.

Figure 3A:
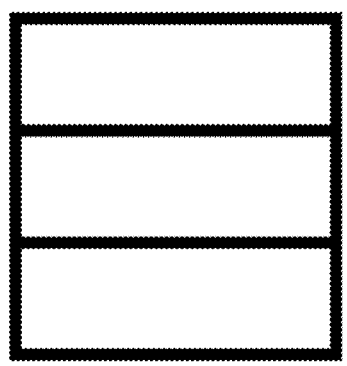
FIGS. 3a-3e illustrate the color display application of the present invention.
Figure 3B:
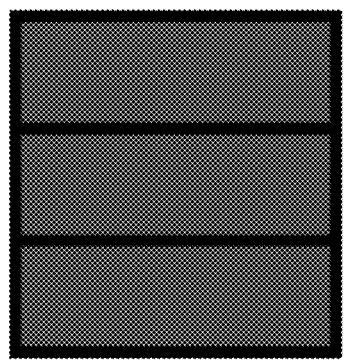
Figure 3C:
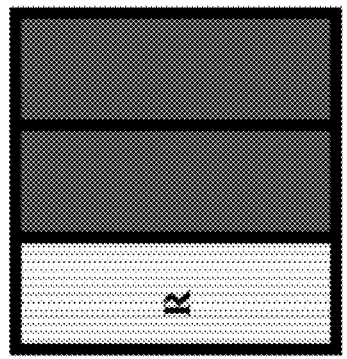
Figure 3E:
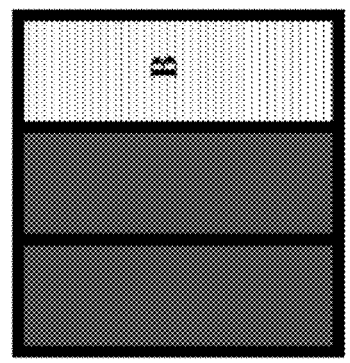
Figure 3D:
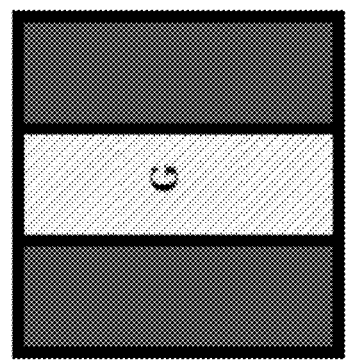

In FIG. 3a, when a white pixel is desired, all three sub-pixels are turned to the white color state. In FIG. 3b, when a black pixel is desired, all three sub-pixels are turned to the black state. FIG. 3c, when a red color is desired, one of the sub-pixels is turned to red and the remaining two sub-pixels are turned to the black state for maximum color saturation. Similarly, FIG. 3d and FIG. 3e display the green and blue colors respectively. Alternatively, in FIGS. 3c, 3d and 3e, one of the sub-pixels is driven to the color state while the remaining two sub-pixels are driven to the white state for maximum brightness (at the expense of the color saturation). Further alternatively, in FIGS. 3c, 3d and 3e, one of the sub-pixels is driven to the color state while the remaining two sub-pixels are driven to the black and white states respectively. Such a full color display can have the same black and white characters of a good black and white display, but also show red, green and blue colors of high quality.

FIG. 3 may also be applicable to the design of FIG. 2. The advantage of the scheme in FIG. 2 is that the achievable white state will be higher than that achievable in the scheme in FIG. 1 because the interstitial absorption in the white state will be one third of that in FIG. 1. On the other hand, in order to achieve the best possible black state, the absorption of the colored fluid, the depth of the display cell and the particle concentration will have to be tightly controlled.

In order to achieve better whiteness, a fourth sub-pixel may be added in FIG. 3, which sub-pixel can only display either white or black color state.

Third Design:

FIG. 4 illustrates a further alternative design. This design is similar to the design of FIG. 2, except that in the second layer (42), there is at least one in-plane electrode (42b and 42c) and the pixel electrode (42a) is sandwiched between the two in-plane electrodes. There are gaps between the electrodes.

In addition, there is a white background layer (45), which may be above or underneath the second layer. Alternatively, the second layer may serve as the background layer.

In the example of FIGS. 4a-4d, white and blue charged pigment particles are dispersed in a green solvent.

The operations of FIGS. 4a-4d are similar to those of FIG. 2a-2c, when proper voltages are applied to the common, pixel and in-plane electrodes.

Figure 4A:
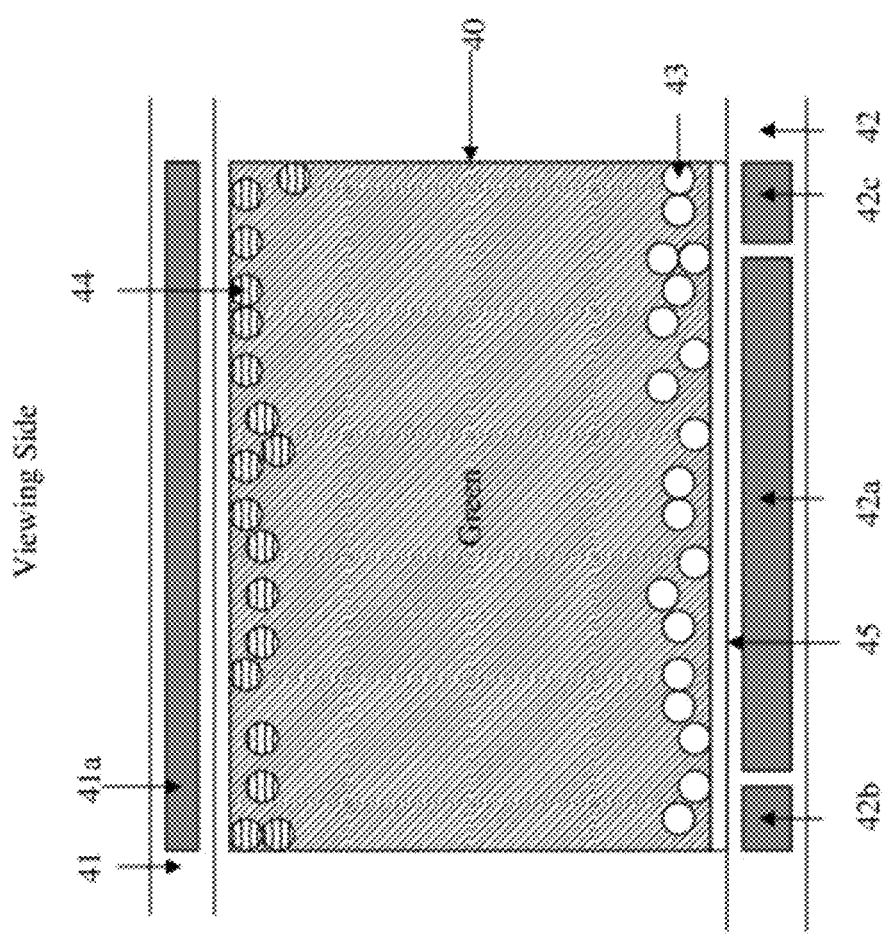
Figure 4B:
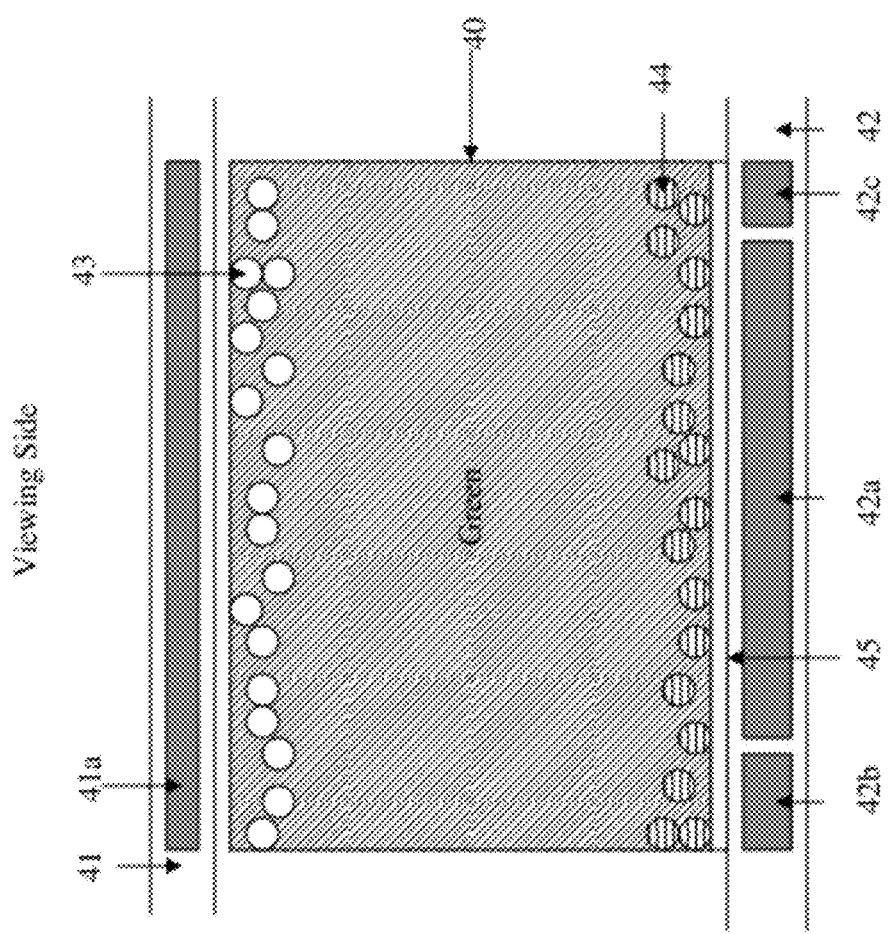

In FIG. 4a, the blue charged pigment particles move to be at or near the common electrode (41a), the blue color is seen. In FIG. 4b, the white charged pigment particles move to be at or near the common electrode (41a), the white color is seen. In FIG. 4c, the white and blue pigment particles are dispersed in the green solvent and as a result, the black color state is seen.

In this alternative design, there is an additional color state (see FIG. 4d), that is, when proper voltages are applied to the common (41a), pixel (42a) and in-plane (42b and 42c) electrodes, the white and blue pigment particles move separately to be at or near the in-plane electrodes. In this case, the green color is seen at the viewing side.

Therefore in this alternative design, each display cell can display four color states, black, white, the color of the colored particles and the color of the solvent. The color of the colored pigment particles and the color of the solvent are complementary to each other.

The colored solvent in this design may also be replaced with a clear and colorless solvent with non-charged or slightly charged colored particles embedded therein, as described above.

In this case, each pixel only needs to have two sub-pixels. FIG. 5 is an example illustrating this scenario. Each display cell represents a sub-pixel. Display cell X in the figure is filled with a fluid comprising white charged pigment particles and red charged pigment particles dispersed in a green solvent and display cell Y is filled with a fluid comprising white charged pigment particles and red charged pigment particles dispersed in a blue solvent.

Figure 5A:
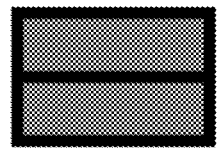
FIGS. 5a-5e illustrate the color display application utilizing the design of FIG. 4.
Figure 5B:
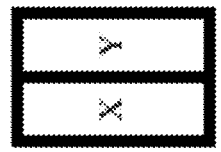
Figure 5C:
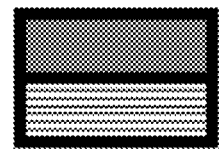
Figure 5D:
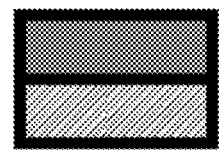
Figure 5E:
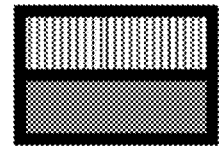

When a white pixel is desired, both display cells are turned to the white (W) state (see FIG. 5a) and when a black pixel is desired, both display cells are turned to the black (K) state (see FIG. 5b). When a blue pixel is desired, cell X is turned to the black (K) state while cell Y is turned to the blue (B) state (see FIG. 5c). When a green pixel is desired, cell X is turned to the green (G) state while cell Y is turned to the black (K) state (see FIG. 5d). When a red pixel is desired, cell X is turned to the red (R) color state while cell Y is turned to the black (K) state (see FIG. 5e). Alternatively, cell X in FIG. 5c, cell Y in FIG. 5d or cell Y in FIG. 5e may be turned to the white state instead of black, providing a brighter but less saturated color.

As stated, FIG. 5 is an example, and alternative combinations are also possible to achieve the five color states.

It is also noted that the voltages applied to the electrodes illustrated in the designs of FIGS. 1, 2 and 4 are usually in the form of waveforms. In other words, the images displayed by the display devices of the present invention may be achieved by the application of a series of waveforms. It should also be noted that the electrode configurations of 42a, 42b and 42c in FIG. 4 may be of any size and shape as long as they can collect both sets of particles to different portions of the display cell.

The display cells referred to in the present application may be of a conventional walled or partition type, a microencapsulated type or a microcup type. In the microcup type, the electrophoretic display cells may be sealed with a top sealing layer. There may also be an adhesive layer between the electrophoretic display cells and the common electrode. The term "display cell" is intended to refer to a micro-container which is individually filled with a display fluid. Examples of "display cell" include, but are not limited to, microcups, microcapsules, micro-channels, other partition-typed display cells and equivalents thereof.

While particular forms of the invention have been illustrated and described, it will be apparent that various modifications can be made without departing from the scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A display device comprising display cells, wherein each of said display cells is
   a) sandwiched between a first layer comprising a common electrode and a second layer comprising a pixel electrode, and
   b) filled with a display fluid comprising a first type of pigment particles which is white and a second type of pigment particles which is red, green or blue, and said two types of pigment particles are oppositely charged and are dispersed in a black solvent,
   wherein said black solvent comprises non-charged or slightly charged black particles dispersed in a clear and colorless solvent.

2. The display device of claim 1, wherein said white pigment particles are formed from $TiO_2$.

3. The display device of claim 1, wherein at least one type of the pigment particles are encapsulated pigment particles.

4. The display device of claim 1, wherein said display fluid further comprises a charge control agent.

5. The display device of claim 1, wherein said non-charged or slightly charged black particles are substantially transparent.

6. The display device of claim 1, wherein the non-charged or slightly charged black particles have a zeta potential of <20.

7. The display device of claim 1, wherein the non-charged or slightly charged black particles are polymeric and are in the form of a transparent polymeric matrix, with dye molecules embedded in the matrix.

8. The display device of claim 1, wherein each display cell defines a sub-pixel and three sub-pixels forms a pixel.

9. A display device comprising display cells, wherein each of said display cells is
   a) sandwiched between a first layer comprising a common electrode and a second layer comprising a pixel electrode, and
   b) filled with a display fluid comprising a first type of pigment particles which is white and a second type of pigment particles which is red, green or blue, and said two types of pigment particles are oppositely charged and are dispersed in a colored solvent which has a color complementary to the color of the second type of pigment particles,
   wherein the colored solvent comprises non-charged or slightly charged colored particles dispersed in a clear and colorless solvent.

10. The display device of claim 9, wherein each display cell defines a sub-pixel and three sub-pixels form a pixel.

11. The display device of claim 9, wherein said display fluid further comprises a charge control agent.

12. The display device of claim 9, wherein said non-charged or slightly charged colored particles are substantially transparent.

13. The display device of claim 9, wherein the non-charged or slightly charged colored particles have a zeta potential of <20.

14. The display device of claim 9, wherein the non-charged or slightly charged colored particles are polymeric and are in the form of a transparent polymeric matrix, with dye molecules embedded in the matrix.

15. A display device comprising display cells and a white background layer, wherein each of said display cells is
   a) sandwiched between a first layer comprising a common electrode and a second layer comprising a pixel electrode and at least one in-pane electrode, and
   b) filled with a display fluid comprising a first type of pigment particles which are white and a second type of pigment particles which are red, green or blue, and said two types of pigment particles are oppositely charged and are dispersed in a colored solvent which has a color complementary to the color of the second type of pigment particles,
   wherein the colored solvent comprises non-charged or slightly charged colored particles dispersed in a clear and colorless solvent.

16. The display device of claim 15, wherein each display cell defines a sub-pixel and two sub-pixels form a pixel.

17. The display device of claim 15, wherein said display fluid further comprises a charge control agent.

18. The display device of claim 15, wherein said non-charged or slightly charged colored particles are substantially transparent.

19. The display device of claim 15, wherein the non-charged or slightly charged colored particles have a zeta potential of <20.

20. The display device of claim 15, wherein the non-charged or slightly charged colored particles are polymeric and are in the form of a transparent polymeric matrix, with dye molecules embedded in the matrix.

\* \* \* \* \*